(12) United States Patent
McNulty et al.

(10) Patent No.: US 6,793,743 B2
(45) Date of Patent: Sep. 21, 2004

(54) VEHICLE STRUCTURAL BEAM AND METHOD OF MANUFACTURE

(75) Inventors: Frank G. McNulty, Rochester Hills, MI (US); Gerald Hackstock, Clay Township, Macomb County, MI (US); Jeffrey L. Bladow, West Bloomfield, MI (US)

(73) Assignee: Pullman Industries, Inc., Troy, MI (US)

( * ) Notice: Subject to any disclaimer, the term of this patent is extended or adjusted under 35 U.S.C. 154(b) by 58 days.

(21) Appl. No.: 10/200,546

(22) Filed: Jul. 22, 2002

(65) Prior Publication Data

US 2002/0174921 A1 Nov. 28, 2002

Related U.S. Application Data

(62) Division of application No. 09/777,379, filed on Feb. 6, 2001, now Pat. No. 6,454,884.
(60) Provisional application No. 60/211,100, filed on Jun. 12, 2000.

(51) Int. Cl.[7] .............................................. C22C 38/00
(52) U.S. Cl. ..................... 148/320; 148/902; 296/188
(58) Field of Search .............................. 148/320, 902, 148/521; 296/188

(56) References Cited

U.S. PATENT DOCUMENTS

| | | |
|---|---|---|
| 1,649,922 A | 3/1927 | Paull |
| 2,746,141 A | 5/1956 | Hobrock |
| 2,783,788 A | 3/1957 | Ungerer |
| 2,817,364 A | 12/1957 | Crawford |
| 3,352,724 A | 11/1967 | McNitt et al. |
| 3,905,630 A | 9/1975 | Cantrell |
| 4,090,734 A | 5/1978 | Inami et al. |
| 4,599,843 A | 7/1986 | Ingvarsson |
| 4,708,390 A | 11/1987 | Palentyn et al. |
| 4,836,866 A | 6/1989 | Thuse |
| 4,838,606 A | 6/1989 | Furubayashi et al. |
| 4,948,196 A | 8/1990 | Baba et al. |
| 5,080,427 A | 1/1992 | Sturrus et al. |
| 5,124,186 A | 6/1992 | Wycech |
| 5,163,225 A | 11/1992 | Goleby |
| 5,232,261 A | 8/1993 | Kuroda et al. |
| 5,272,841 A | 12/1993 | Freeman et al. |
| 5,370,437 A | 12/1994 | Alberda |
| 5,404,690 A | 4/1995 | Hanf |
| 5,466,032 A | 11/1995 | Clausen et al. |
| 5,540,016 A | 7/1996 | Clausen |
| 5,580,120 A | 12/1996 | Nees et al. |

(List continued on next page.)

FOREIGN PATENT DOCUMENTS

| | | |
|---|---|---|
| DE | 198 57 589 | 7/1999 |
| EP | 0 952 020 | 10/1999 |
| SE | 508 222 | 9/1998 |
| SU | 1822426 A3 | 6/1993 |
| WO | WO 97/35039 | 9/1997 |

*Primary Examiner*—Deborah Yee
(74) *Attorney, Agent, or Firm*—Flynn, Thiel, Boutell & Tanis, P.C.

(57) ABSTRACT

A vehicle structural beam, such as a door intrusion beam, which possesses an elongate tubular beam part which at opposite ends is provided with mounting flanges for securement to a vehicle frame. The elongate tubular beam part and the flanges provided at opposite ends are defined by an integral, one-piece, monolithic steel structure which has been initially roll-formed from an elongate flat metal sheet to define the closed tubular structure of the tubular beam part, and which has been subjected to heating and quenching so that the elongate tubular beam part is of relatively high strength steel throughout its entire length, whereas the integrally and monolithically joined end flanges remain as lower strength steel which has been significantly unaffected by the heat treatment and quenching so as to permit appropriate shaping thereof and ease of welding to the vehicle frame.

10 Claims, 8 Drawing Sheets

U.S. PATENT DOCUMENTS

| | | |
|---|---|---|
| 5,600,931 A | 2/1997 | Jonsson |
| 5,669,992 A | 9/1997 | Bronsema et al. |
| 5,756,167 A | 5/1998 | Tamura et al. |
| 5,785,376 A | 7/1998 | Nees et al. |
| 5,813,718 A | 9/1998 | Masuda et al. |
| 5,813,719 A | 9/1998 | Kowalski |
| 5,868,456 A | 2/1999 | Kowalski et al. |
| 5,884,960 A | 3/1999 | Wycech |
| 5,887,938 A | 3/1999 | Töpker et al. |
| 5,916,389 A | 6/1999 | Lundstrom |
| 5,924,760 A | 7/1999 | Krajewski et al. |
| 6,050,049 A | 4/2000 | Kowalski et al. |
| 6,185,978 B1 | 2/2001 | Sundgren et al. |
| 6,261,392 B1 | 7/2001 | Sundgren et al. |

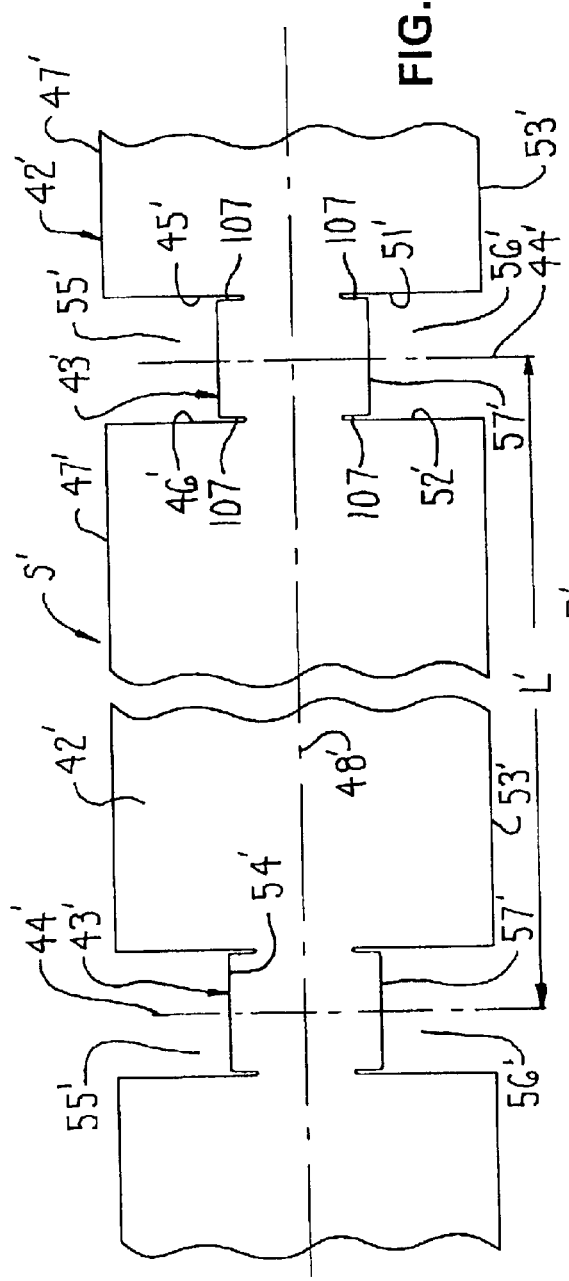
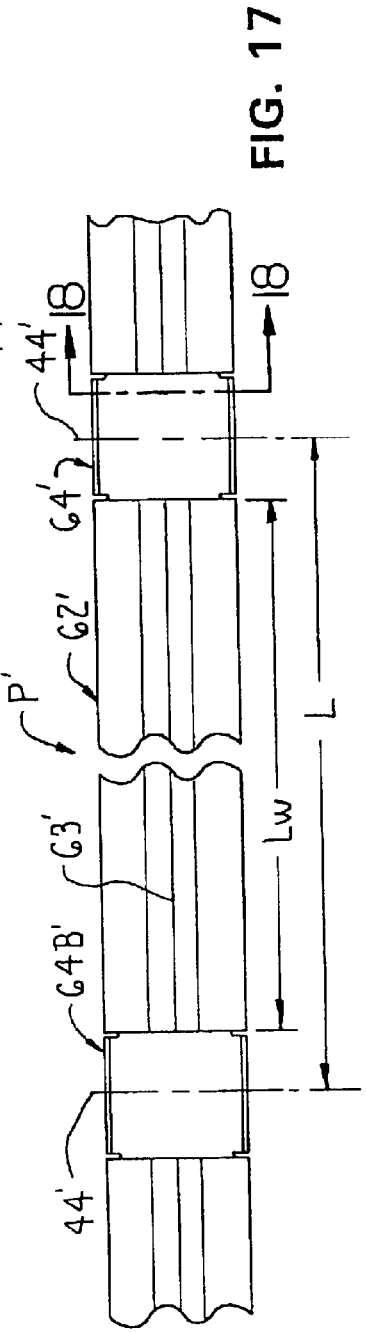
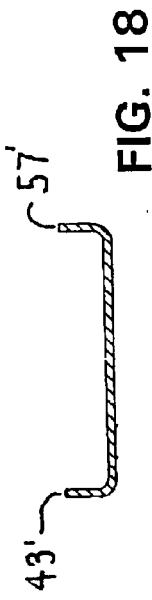
FIG. 16
FIG. 17
FIG. 18

VEHICLE STRUCTURAL BEAM AND METHOD OF MANUFACTURE

CROSS-REFERENCE TO RELATED APPLICATION

This is a division of Ser. No. 09/777,379, filed Feb. 6, 2001 now U.S. Pat. No. 6,454,884 which claims benefit of now abandoned U.S.A. provisional application Ser. No. 60/211,100, filed Jun. 12, 2000, the entire disclosure of which is incorporated herein by reference.

FIELD OF THE INVENTION

This invention relates to a structural beam, particularly for a vehicle such as an automobile or truck, and to an improved beam construction and an improved process for manufacture thereof.

BACKGROUND OF THE INVENTION

Automotive vehicles such as automobiles and trucks employ a significant number of different structural beams associated with the vehicle frame to provide strength and rigidity. Many such beams are intended to provide increased protection for the vehicle occupants in the event of a collision or other accident. For example, a conventional door for a vehicle such as an automobile or truck has a hollow frame with vertical side rails, a bottom rail and a top rail. A structural door intrusion beam is typically disposed interiorly of the frame at a location spaced upwardly from the bottom rail and extends generally horizontally between and has opposite ends fixed to the side rails. The door intrusion beam thus provides improved strength against side impact on the vehicle door so as to provide improved protection for a passenger in the event of a collision. The door intrusion beam is desirably constructed of a material and/or configuration so as to maximize its strength and effectiveness in the event of a collision. There is, however, a continuing need to improve manufacturing processes to permit the beam to be formed in an economical manner while at the same time providing a beam having desirable impact strength while at the same time minimizing weight.

Numerous beam constructions and manufacturing processes have been developed or formulated in order to attempt to provide a strong intrusion beam, and in particular permit manufacture of a strong intrusion beam from less expensive materials, and in this respect intrusion beams have been developed which involve a wide variety of cross sections, including beams wherein the main elongate beam body has a hat-shaped cross section, an H-shaped cross section, a longitudinally grooved cross section, a hollow tubular cross section, and other complex cross-sectional shapes. In these known beams, the main elongate beam body is provided with flanges at opposite ends which are suitably shaped to enable them to be fixedly secured to the side frames of the door, which fixed securement preferably involves welding. Such flanges are thus preferably of lower grade or lower strength steel in view of the difficulty of welding high strength materials. Hence, many of the known intrusion beams have necessarily involved a multi-piece construction, namely an elongate beam body of one material or shape so as to provide one property, and separate flanges of a different material or property to facilitate attachment to the door frame. These beams and the manufacturing processes affiliated therewith are typically of greater complexity and cost than is desired.

For example, in one known construction, the elongate beam body is formed as a hollow tubular member which is roll-formed to define an elongate tubular element, with the material used for forming the roll-form being of lower strength. Following roll-forming and welding, the elongate sheet is then subjected to intermittent heating and quenching at selected lengths therealong so as to provide for strength increases in the element at selected locations. The element is cut to length to define a beam part. Separate preformed end flanges of lower strength steel are then welded to the ends of the elongate center beam body, which ends have not been heat treated. This overall forming process is, however, unnecessarily complex due to the way in which the quenching of the roll-formed tubular section is heat treated in an intermittent manner at select locations, which also causes loss in strength adjacent the beam ends, and wholly separate end flanges are separately manufactured and thereafter secured to the ends of the tubular beam.

Examples of various door intrusion beam constructions, and the manufacturing processes therefor, are illustrated by U.S. Pat. Nos. 4,090,734, 4,599,843, 4,708,390, 4,838,606, 5,080,427, 5,124,186, 5,232,261, 5,272,841, 5,370,437, 5,404,690, 5,466,032, 5,540,016, 5,600,931, 5,756,167, 5,785,376, 5,813,718, 5,813,719, 5,868,456, 5,884,960, 5,887,938.

Vehicles such as automobiles and trucks also employ numerous other types of structural beams for defining part of the vehicle for structural and/or safety purposes, and examples of such beams are bumpers, roof bows, etc. These beams desirably provide high strength, but the need to provide weldable mounting flanges often compromises the selection of beam material and the overall strength of the beam, thus resulting in undesired increases in beam size and/or wall thickness, and consequent increases in weight.

Accordingly, it is an object of this invention to provide an improved method of manufacturing a structural beam for a vehicle, and an improved beam structure, which in one embodiment comprises a door intrusion beam, and which improves on and overcomes many of the constructional or processing disadvantages associated with conventional processes and constructions.

More specifically, the present invention relates to an improved structural beam, particularly for a vehicle, which possesses an elongate tubular beam part which at opposite ends is provided with suitably shaped mounting flanges for securement to a vehicle frame. The elongate tubular beam part and the flanges provided at opposite ends thereof are all defined by an integral, one-piece, monolithic steel structure which has been initially roll-formed from an elongate flat metal sheet so as to define the closed tubular structure of the tubular beam part, and which has been subjected to heating and quenching so that the elongate tubular beam part is of relatively high strength steel throughout its entire length, whereas the integrally and monolithically joined end flanges remain as lower strength steel which has been significantly unaffected by the heat treatment and quenching so as to permit appropriate shaping thereof and ease of welding to the vehicle frame. This beam is particularly desirable for use, for example, as a door intrusion beam, a roof bow beam, or an exterior vehicle bumper.

The present invention also relates to an improved process for forming the structural beam, as aforesaid, which process involves forming beams by providing an elongate sheet of relatively flat low-strength steel, subjecting the sheet to appropriate notching and/or slitting operations in those areas of the sheet which will ultimately be formed into the end flanges, then feeding the elongate sheet through a roll-forming mill so that the sheet is transversely deformed (i.e.

rolled) into an elongate profile having a reshaped cross section which includes a substantially closed tubular cross section which extends along the un-notched region of the sheet to define the elongate center tubular beam part, with the notched regions of the sheet failing to define a closed tubular section due to the presence of the notches. The roll-formed profile is supplied to an induction heater followed by a quencher to effect heating of solely the closed tubular section so that this section, when quenched, results in the elongate tubular beam part being of relatively high strength. The heating and quenching, however, is ineffective in significantly modifying the properties of the notched regions, and hence they retain their lower strength. These regions are then suitably shaped to define the desired end flanges, which are integrally and monolithically joined to opposite ends of the high-strength elongate tubular beam part, whereupon the finished structural beam can be more easily welded to the vehicle frame, and the flanges also more readily accommodate tolerance variations and distortions which are typically experienced with respect to the frame.

The process of the present invention, as briefly summarized above, preferably effects notching of a substantially continuous sheet at defined intervals therealong to define notched and un-notched regions in a defined arrangement lengthwise along the sheet, with the sheet thereafter being roll-formed to define said profile as an elongate and continuous structure which is still joined to the flat steel sheet. Abutting or contacting edges of the sheet at least through the closed tubular sections are then welded together, and the continuous profile thereafter sequentially moved into and through the induction heater and the quencher. The elongate profile is, after quenching, transversely cut or severed at the notched region to define separate beams having end flanges at opposite ends thereof as defined by the notched regions. The end flanges can be appropriately reshaped, if necessary, as by stamping or the like, to provide the desired configuration.

The improved beam of this invention, and the improved process for forming the beam, both as summarized above, according to a preferred embodiment relate to a door intrusion beam for a vehicle door, whereas alternate embodiments relate to a roof bow beam for a vehicle roof or a vehicle bumper beam.

Other objects and purposes of the invention will be apparent to persons familiar with structures and processes of this general type upon reading the following specification and inspecting the accompanying drawings.

BRIEF DESCRIPTION OF THE DRAWINGS

FIG. 16 is an enlarged fragmentary plan view of a length of metal sheet after cutting and notching, but prior to roll-forming thereof, as used for forming the roof beam of FIGS. 14 and 15.

FIG. 17 is a fragmentary top view of the profile after the sheet of FIG. 16 has passed through and been reshaped in the rolling mill.

FIG. 18 is an enlarged cross-sectional view of the notched region of the profile as taken along line 18—18 in FIG. 17.

Figure 1:
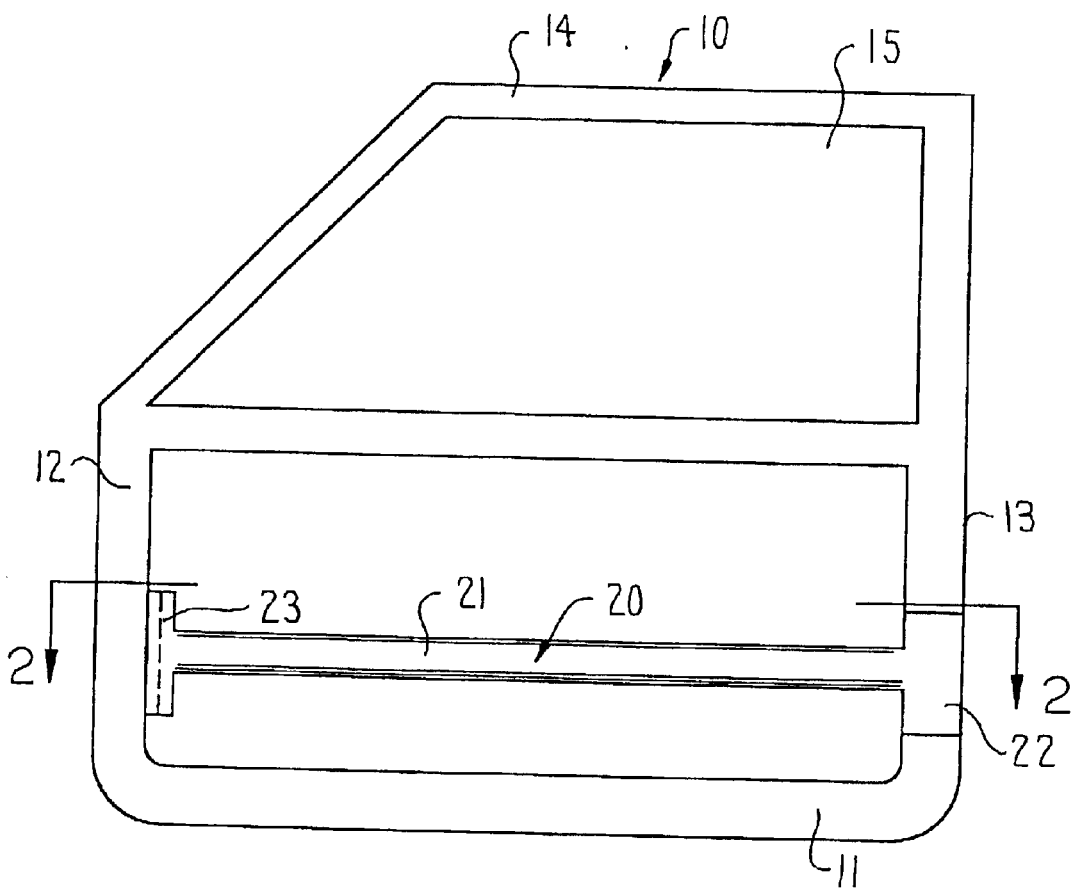
FIG. 1 is a diagrammatic elevational view illustrating a vehicle door frame having a door intrusion beam attached thereto.
Figure 2:
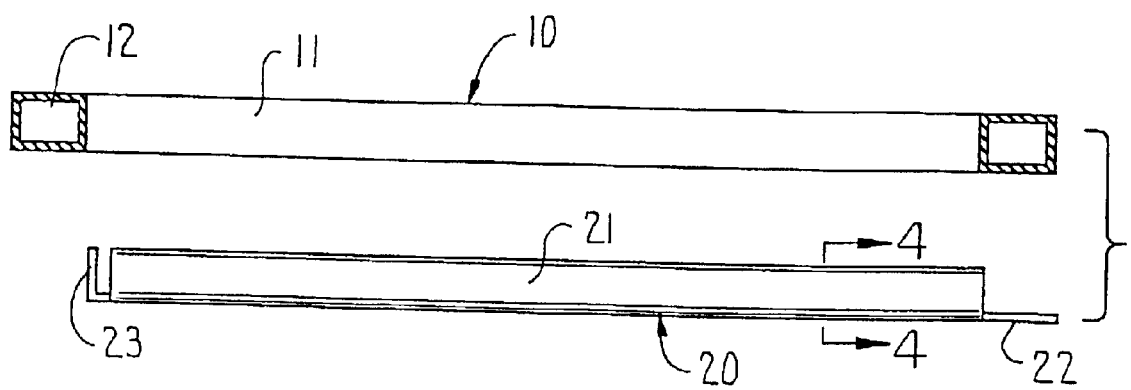
FIG. 2 is a view taken generally along line 2—2 in FIG. 1 and illustrating the intrusion beam separated from the door frame.

Certain terminology will be used in the following description for convenience and reference only, and will not be limiting. For example, the words "upwardly", "downwardly", "rightwardly" and "leftwardly" will refer to directions in the drawings to which reference is made. The word "forward" will also be used to designate the direction of movement of the sheet material during the forming process, which direction is designated by the arrows in FIGS. 5 and 6. Said terminology will include the words specifically mentioned, derivatives thereof, and words of similar import.

DETAILED DESCRIPTION

The improved process for forming a structural beam, and the improved structural beam construction of this invention, will now be described with particular reference to FIGS. 1–10. The structural beam illustrated in FIGS. 1–10 is, according to a preferred embodiment of the invention, a door intrusion beam for a vehicle.

In FIG. 1, there is diagrammatically illustrated a frame 10 of a vehicle door, such as for an automobile or truck. Such frame typically has a bottom frame rail 11 which at opposite ends is rigidly joined to upwardly projecting side rails 12 and 13, which side rails in turn are generally rigidly joined by a top rail 14. The frame is conventionally configured with an opening 15 in the upper portion thereof for accommodating a window. The frame, except for the area of the window, is conventionally covered with a thin exterior skin (not shown), such as sheet metal. This thin skin, and the necessity of maintaining significant open space in the bottom of the door frame to accommodate an openable window, hence results in the door having minimal side impact strength.

To improve upon the side impact strength of the door, it is conventional to include a side impact beam which extends across the lower hollow frame portion and joins to the side rails. In this respect, there is illustrated a side impact beam 20 constructed according to the present invention, which beam is disposed within the hollow frame in upwardly spaced relation to the bottom rail 11, and is fixedly coupled at opposite ends thereof to the frame side rails 12 and 13.

In the illustrated embodiment, the intrusion beam 20 has an elongate tubular center beam part 21 which, at opposite ends, is provided with flanges 22 and 23. These flanges may assume a wide variety of different shapes suitable for accommodating the configuration of the door frame and permitting securement thereto, such by welding. In the illustrated embodiment the one flange 22 has a generally flat plate-like shape which enables it to overlap a surface, such as one side surface of rail 13, whereas the other end flange 23 is illustrated as being of a generally L-shaped cross section so that one leg thereof will overlap an inner surface and permit welded securement to the other side rail 12. It will be appreciated, however, that the shape of the flanges 22 and 23 can be varied and determined in accordance with the shape of the door rails and the specific desired configuration for attachment to the door frame rails, and thus other shapes for the flanges 22 and 23 can be provided without departing from the present invention.

Figure 4:
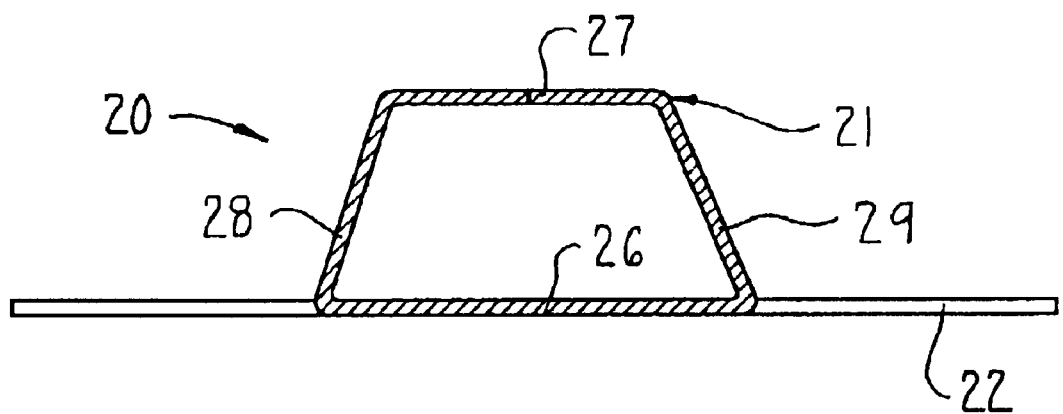
FIG. 4 is an enlarged sectional view of the door beam as taken generally along line 4—4 in FIG. 2.

The door beam 20 in a preferred construction, as illustrated by FIG. 4, has the elongate center tubular beam part 21 provided with a generally four-sided configuration, specifically a trapezoidal cross section defined by a front wall 26 which is generally parallel with but of greater transverse width than the rear wall 27, with these walls 26 and 27 being integrally and monolithically joined together by side walls 28 and 29 which project transversely rearwardly from the front wall 26 and are inwardly inclined so that they generally converge as they project rearwardly for connection with the back wall 27, whereby the trapezoidal configuration of the beam part 21 is thus generally symmetrical about a vertically extending centerline in FIG. 4.

Figure 3:
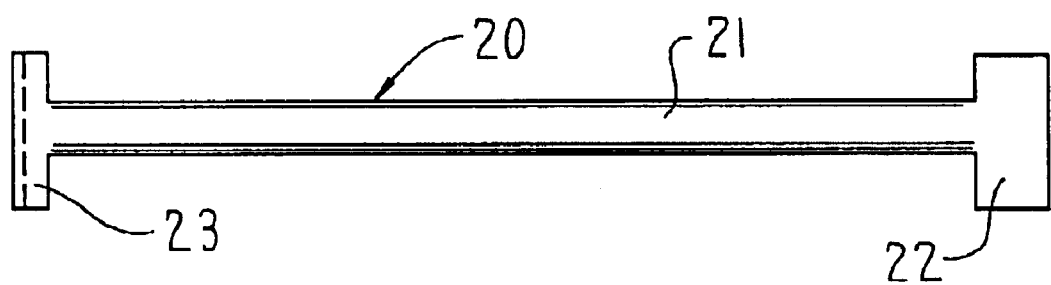
FIG. 3 is a side elevational view which illustrates solely the door beam of the present invention.

In the improved intrusion beam 20 of the present invention as illustrated by FIGS. 3 and 4, the elongate tubular center part 21 is, throughout the length thereof, of a relatively high strength steel so that the material properties, coupled with the closed tubular configuration of the beam part 21, thus provide the beam part with significant impact resistance when an impact load is imposed transversely to the longitudinal length of the beam part. The end flanges 22 and 23, however, are of a relatively softer and lower-strength steel in relationship to the center beam part 21. In fact, the strength of the center beam part 21 is significantly greater than the strength of the end flanges 22–23. These latter flanges can thus be more easily and conveniently shaped or formed so as to accommodate and conform to the configuration of the door frame side rails, and can obviously be much more easily welded to the door frames because of the lower strength and hardness properties of the flanges. Even though the flanges 22–23 have significantly different strength and hardness properties in comparison to the center beam part 21, these flanges 22 and 23 are nevertheless integrally and monolithically joined to the center beam part 21, and in fact beam part 21 and flanges 22–23 are all initially formed from a monolithic one-piece flat sheet of steel, preferably low grade (i.e., relatively low strength and low hardness) steel.

Forming the steel sheet so as to result in a monolithic structural beam, specifically a door intrusion beam, having the construction and properties summarized above will be hereinafter described.

There is provided a supply station 31 for supplying sheet steel, preferably a substantially continuous and elongate strip of sheet steel S. The sheet steel at supply station 31 is preferably provided in the form of a conventional coil 32 wherein the sheet steel is effectively spirally wound, with the coil being appropriately rotatably supported on a conventional coil stand 33. The thin and relatively flexible sheet steel S is withdrawn from the coil 32 and fed into and through a sheet driving station or device 35, such being conventional and typically employing upper and lower drive rolls which drivingly engage opposite sides of the steel sheet S for advancing the sheet forwardly into and through the subsequent forming and processing stations. The sheet steel is advanced from the driving station 35 to a station 41, such as a punching press or the like, which effects forming of notches as well as cuts or slits in the flat sheet S fed therethrough. The station 41 can effect this operation either while the sheet S is momentarily stopped, as controlled by the drive station 35, or in a continuous and sequential manner as the sheet is fed through the station 41 by forming the station 41 with forming or cutting dies mounted on appropriate moving punching heads. In its passage through the station 41 the flat sheet S is appropriately punched, cut or slit at spaced intervals so that the sheet S' departing the station 41 possesses un-notched or uncut portions 42 (FIG. 7) disposed generally in uniformly spaced relationship along the sheet S', with the un-notched portions 42 being joined by notched portions 43 which alternate with the un-notched portions 42. The notches, cuts and/or slits as formed at station 41 are selected so as to provide the configuration of the structural beam being formed, such as the door intrusion beam in this described embodiment.

Figure 7:
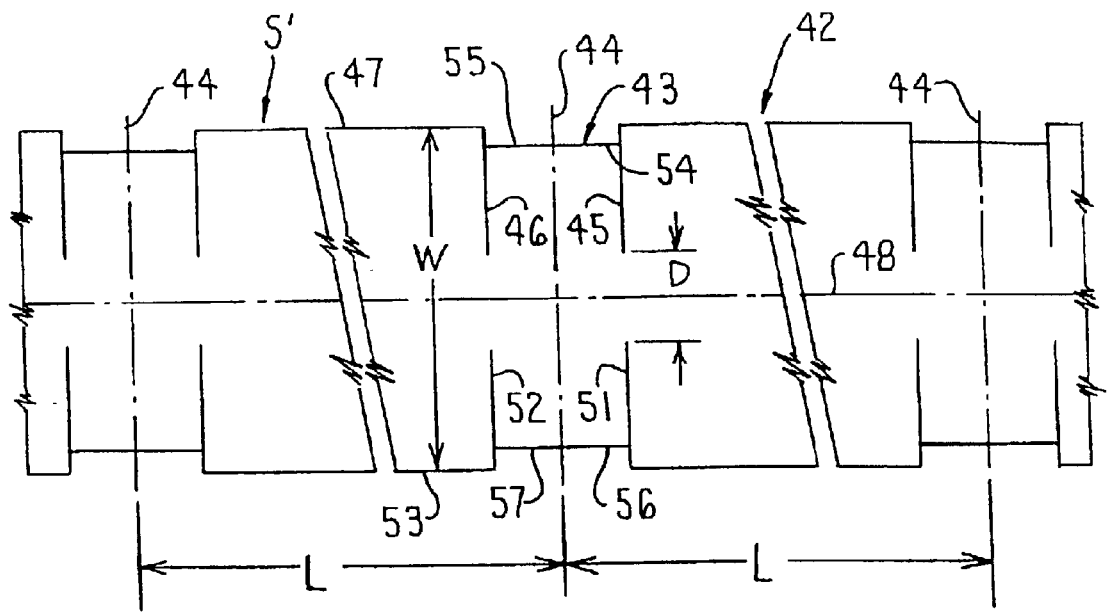
FIG. 7 is an enlarged fragmentary plan view of a length of the sheet following slitting and notching thereof, but prior to roll-forming thereof.
Figure 8:
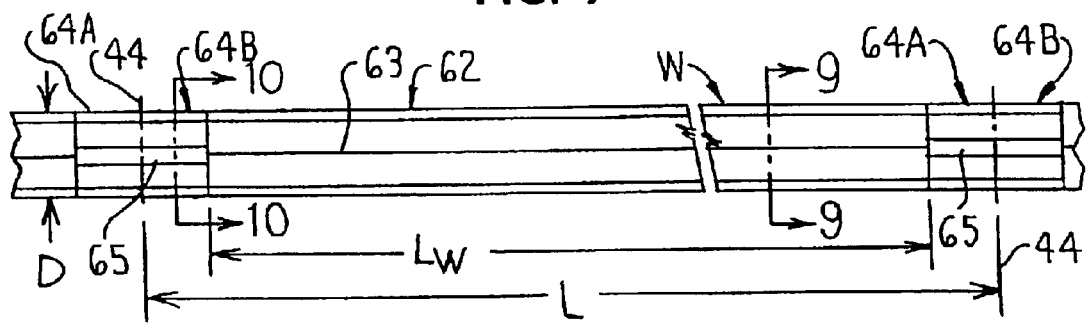
FIG. 8 is a fragmentary top view showing the formed sheet as it departs from the rolling mill.

As illustrated in FIG. 7, the alternating un-notched and notched portions 42 and 43 respectively define successive but integrally connected sheet lengths L which are defined between generally parallel planes 44 which effectively perpendicularly intersect adjacent notched portions 43. While these planes 44 in the illustrated embodiment extend generally through the centers of the notched portions 43 when viewed longitudinally of the sheet, it will be appreciated that the planes can be offset in a direction toward either side of this center location if desired, so long as the uniformity of the sheet module length L is maintained.

The cutting and notching which occurs at station 41 (which may involve one or more simultaneous or sequential operations), and which results in the notched portions 43, causes each notched portion 43 to be defined by cuts or slits which extend through the thickness of the material, with slits 45 and 46 extending inwardly from one side edge 47 of the sheet and projecting inwardly toward but terminating short of the longitudinally extending centerline 48 of the sheet. A further pair of cuts or slits 51 and 52 also extend through the thickness of the material and project transversely inwardly from the other side edge 53 of the sheet, with slits 51 and 52 also projecting inwardly but terminating short of the longitudinal centerline 48. The slits 45 and 51 at their inner ends are generally aligned and separated by a transverse unslit region having a transverse dimension D, and a similar relationship exists between the opposed inner ends of the slits 46 and 52.

The station 41 in the illustrated embodiment also effects forming of notches or cutouts at the notched portion 43, including specifically a first notch or cutout 55 which is defined by a cut line 54 which is spaced inwardly a small distance from and approximately parallel with the side edge 47 and which extends transversely between and intersects the slits 45, 46, thereby creating a substantially rectangular notch or cutout region 55 which projects inwardly a defined distance from the free edge 47 of the sheet and extends lengthwise between the slits 45 and 46.

A similar cutout or recess 56 is defined in the notch portion 43 adjacent the other sheet side edge 53. This notch 56 again projects inwardly a limited distance from the sheet side edge 53, and terminates at an inner cut line or edge 57 which extends generally transversely between and intersects the slits 51 and 52. The notched portion 43 thus has a width extending perpendicularly between the cut edges 54 and 57 which is, due to the presence of the cutouts or recesses 55 and 56, less than the width W of the sheet, which width is defined across the un-notched portions 42.

As will be apparent from the following description, the un-notched portion 42 defines the elongate center beam part 21, whereas the notched portion 43 in this embodiment defines flange parts for two adjacent beams, one side of the notched portion defining the flange 22 at one end of one beam, and the other side of the notched portion defining the end flange 23 of an adjacent beam.

The formed sheet S' departing the forming station 41, and having alternating notched and un-notched portions as illustrated by FIG. 7, is then fed into a conventional roll-forming mill 61 which includes a plurality of sequential rolling stations 62 which include opposed upper and lower forming rollers which engage opposite sides of the sheet to progressively deform the sheet from its flat condition into a desired three-dimensional shape or profile. In the present invention, the rolling mill 61 progressively deforms the sheet S' which, when fed into the first station of the mill is of a relatively flat sheetlike configuration, into a three-dimensional configuration which, upon leaving the mill, has a generally closed tubular cross section or profile throughout at least the un-notched portions 42 of the sheet. The formed, non-flat, three-dimensional profile as it departs the rolling mill is designated P in FIGS. 5 and 6 since the steel sheet is no longer flat.

Figure 9:
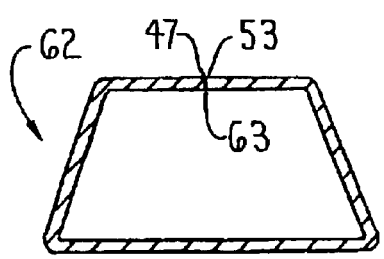
FIG. 9 is an enlarged cross-sectional view taken generally along line 9—9 in FIG. 8.

Upon departing the rolling mill 61, the formed three-dimensional profile P has, throughout the un-notched portions 42, a substantially closed tubular cross section as designated 62 in FIG. 9. The overall un-notched portion 42 of the sheet has been suitably reshaped or reformed by the mill 61 into a tubular cross section so that the side edges 47 and 53 of the original un-notched portions 42 of the sheet substantially meet or contact one another, thereby effectively defining a seam 63 which runs longitudinally throughout the closed tubular section 62.

Figure 10:
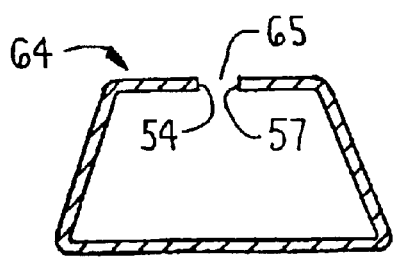
FIG. 10 is an enlarged cross-sectional view taken generally along line 10—10 in FIG. 8.

Since the notched portions 43 are subjected to the same roll-forming operations in the mill 61 as the un-notched portions 42, the notched portions 43 in this illustrated embodiment upon departing the mill have also been formed into a three-dimensional shape or profile 64 (FIG. 10) which, rather than being a closed tube, instead resembles a partially open channel, or as shown by FIG. 10 resembles a closed tube having an open slot extending longitudinally therealong, such slot being indicated at 65 with opposite sides thereof being defined by the cut edges 54 and 57. This roll-formed sheet section 64 thus has an open cross-sectional configuration due to the presence of the slot 65.

The construction and operation of the rolling mill 61 is conventional and well known, and further description thereof is believed unnecessary.

The three-dimensional roll-formed profile P departing the rolling mill 61 thus has alternating closed tubular sections 62 and open sections 64, which sections respectively have lengths corresponding to the longitudinal lengths of the un-notched sheet portions 42 and notched sheet portions 43. These alternating profile portions 62 and 64 define a continuous formed profile P which is then fed into a seaming station 71, such as a conventional resistance seam welder which rolls along the seam 63 of the workpiece portions 62 so as to effect welding together of the meeting edges 47 and 53 to thereby form a fixed closed tubular cross section. The welding of the seam 63 occurs substantially continuously as the formed profile P is moved through the welding station 71. As the open profile sections 64 move through the welding station 71 and in particular pass beneath a welding wheel, the welding wheel will be located in alignment with the air gap 65 which extends longitudinally of the workpiece sections 64, and thus no welding operation will occur. Because of this air gap 65, however, the welding wheel can remain continuously energized, and hence complex on-off controls for the welding station are not required.

The continuous elongate formed profile P having alternating welded closed tubular sections 62 and open or nontubular sections 64 is then successively fed into and through a heating station 72 and a quenching station 73 so that the welded closed tubular sections 62 of the profile P, upon departing the quench station 73, will be of significantly higher strength and hardness.

More specifically, the heating station 72 comprises a conventional electric induction heating oven which, as is well known, includes a heating tunnel defined by an electrically energized heating coil through which the profile P is passed. Due to the inductive field created by the electrical inductive heating coil and the continuous peripherally closed wall defined by the welded tubular profile sections 62, these sections 62 act like the secondary windings of a transformer and are rapidly heated to a high temperature sufficient to cause a change in the properties of the steel, such being conventional and well known, whereupon when these heated sections 62 then immediately move into the quench station 73, they are rapidly cooled by being sprayed with a cooling fluid such as water or other known quenching fluids such that the temperature of the sections 62 is rapidly decreased, thereby changing the properties of the steel defining the tubular sections 62 so that these sections now have a strength and hardness characteristic which is significantly greater than the strength and hardness characteristic of the steel prior to entering the heating station 72.

As to the open profile of the workpiece sections 64, however, the air gap or slot 65 which extends longitudinally of these sections 64 effectively creates a short circuit in the peripheral direction of the workpiece sections 64 and hence prevents any significant inductive heating of the material of these sections by the surrounding inductive coil. These open workpiece sections 64, in contrast to the closed workpiece sections 62, thus experience very little increase in temperature, and hence do not undergo any significant change in their material properties. Upon departing the quench station 73, the open workpiece sections 64 hence maintain physical properties which generally correspond to their physical properties upon entering the heating station 72, namely these sections 64 remain of relatively low strength and low hardness. The formed profile P' departing the quench station 73 hence now has workpiece sections 62 which are of a closed tubular cross section and have relatively high strength and hardness, and alternating open workpiece sections 64 which are of significantly lower strength and hardness in that these properties more closely resemble the physical properties of the original steel sheet material S.

The heating station 72 and quenching station 73 can, if desired, be positioned within a single and substantially continuous enclosure or shroud 74 if desired.

The continuous three-dimensional heat treated profile departing the quenching station 73, which heat treated profile is designated P', is then fed to a conventional cutting station 75 which sequentially causes the continuous profile P' to be transversely cut or severed into individual elongate workpieces W which have the predefined module length L. The cutting at workstation 75 will normally be carried out at planes which correspond to the predefined transverse planes 44, whereby the cuts thus occur within the non-heat treated profile sections 64 at a location spaced between the longitudinal ends thereof. This results in each severed workpiece W having an elongate closed tubular center part 77 which is defined by the heat treated profile section 62 and hence corresponds to the center beam part 21 of the finished door intrusion beam 20. The center workpiece part 77 has end workpiece parts 78 and 79 at opposite ends thereof, the latter being parts from the non-heat treated open profile sections 64 which, of course, correspond to the un-notched sections 43. These end parts 78 and 79 of the workpiece can be of the same or different lengths, depending upon the selected position of the cutting plane and the desired shape and size of the end flanges 22, 23.

The individual elongate workpiece W is then fed to a forming station 76 which effectively reshapes the workpiece ends 78 and 79, either simultaneously or sequentially. More specifically, the one end part 78, which has an open channel-like configuration, can be suitably flattened so as to define the desired flange configuration such as the flange 22, and the other end part 79 is also suitably reformed so as to define the desired shape of the other end flange 23. The station 76, which may comprise one or more sequential forming operations or stations, hence effects necessary pressing, stamping and reforming so that the open channel-like end parts 78 and 79 are appropriately reshaped into the desired configurations of the end flanges 22 and 23. Since the end parts 78 and 79 have not been heat treated and hence possess relatively low strength and low hardness material properties, the reshaping of the end parts 78–79 so as to form the end flanges 22–23 can be relatively easily accomplished.

The workpiece departing the forming station 76 thus constitutes the finished structural intrusion beam 20. Such structural beam 20 thus possesses end flanges 22 and 23 which are of relatively low grade steel in that they possess lower strength and lower hardness, and thus not only can be more readily welded to the vehicle (i.e. door) frame, but they also will more readily deform so as to compensate for distortions and the like which are typically encountered in vehicle (i.e. door) frames. The center beam part 21, on the other hand, has a closed tubular cross section throughout, and the material of this center part 21 is of high strength and hardness, namely having a strength which is significantly greater than that of the end flanges 22, 23, whereby the center beam part 21 thus possesses significantly increased strength so as to withstand side impact forces thereagainst, such as due to a collision-caused side impact against the vehicle door.

The transverse slits 45–46 and 51–52 which effect a separation line between the notched and un-notched portions 42–43, whereby these portions are joined together solely through the small strip of material at the dimension D, which strip D effectively defines the base wall 26 of the finished door beam, enables the transition from the high-strength material of the tubular beam part 21 to the low-strength material of the flanges 22–23 to occur over a very short transitional distance, whereby the desired high strength of the beam part 21 hence can be achieved over substantially the entire length of the beam part 21 so as to maximize the strength thereof.

If necessary or desired, the width of the slits 45–46 and 51–52 can be increased, such as by making the slits as narrow slots or notches, if such is necessary or desirable to improve the isolation between the adjacent notched and un-notched sections 64 and 62 as they progress through the induction heating station.

As an example of the expected materials usable for forming the improved structural beam and specifically a door intrusion beam and in accordance with the improved forming process, the sheet steel S will preferably be relatively low grade and hence low-strength steel so as to minimize initial cost thereof. As an example, the initial low grade steel will normally have a yield strength in the range of 27,000 to 35,000 psi, with a possible upper limit being no more than about 50,000 psi. After the profile P' of the present invention has been heat treated and quenched at stations 72 and 73, however, the steel defining the closed tubular sections 62 will now preferably have a yield strength in the range of from about 120,000 psi to about 200,000 psi, with the desired yield strength range being from about 160,000 to about 180,000 psi. The open profile section 64, however, will still have a yield strength property which will be similar to or only slightly greater than that of the originally supplied steel, with any increase being due primarily to the cold working thereof in the roll mill. The heat treated sections 62 will thus have a yield strength which will typically be more than double the yield strength of the non-heat treated sections 64. The resulting structural beam 20 thus has a closed tubular beam part 21 of high-strength steel which rapidly and integrally transitions into end flanges 22, 23 of low-strength steel.

The sheet steel used for forming the intrusion beam 20 will typically have a thickness in the range of from about 0.090 inch to about 0.150 inch, with the preferred thickness being in the neighborhood of about 0.120 inch.

Further, the width of the sheet steel S will normally be selected so that same is sufficient to be formed into a three-dimensional profile having the desired cross section of the finished beam, yet avoid having to effect any significant removal of edge material as waste. Under most circumstances it is anticipated that the sheet steel S for forming a door intrusion beam will have an initial maximum width in the range of about 6 to 8 inches.

Figure 11:
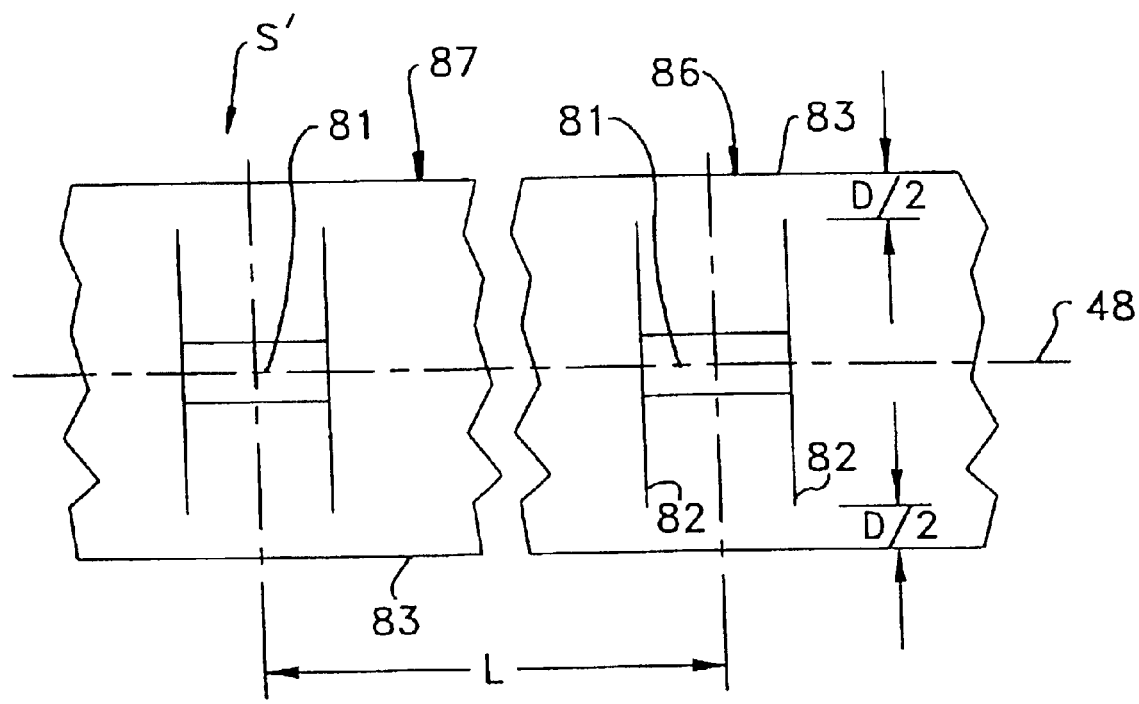
FIG. 11 is a fragmentary view which corresponds generally to FIG. 7 but illustrates a variation in the notching and slitting of the sheet during the manufacturing process.
Figure 12:
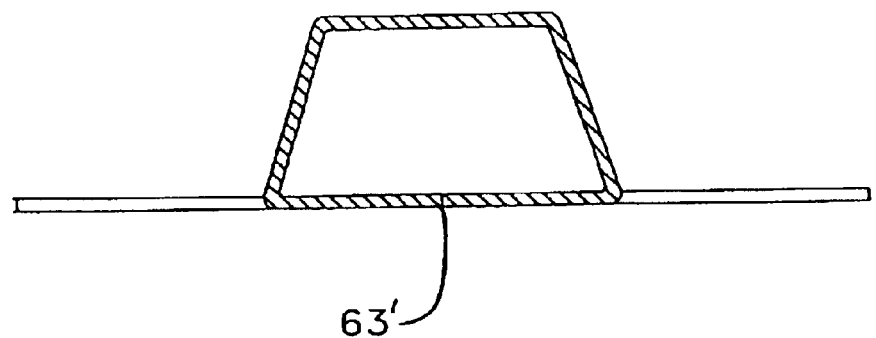
FIG. 12 is a view similar to FIG. 2 but illustrates a cross-sectional view of the door intrusion beam formed utilizing the modified process of FIG. 11.

FIGS. 11 and 12 illustrate a variation of the embodiment of FIGS. 1–10 with respect to the manner in which the sheet is notched and cut at station 41. As illustrated by FIG. 11, particularly in comparison to FIG. 7, the sheet is provided with notches or cut-outs 81 which are disposed at spaced intervals along the sheet and generally centered along the centerline 48 thereof. These cut-outs 81 are generally of a rectangular profile, and opposite ends of each notch 81 are defined by cut lines 82 which project transversely outwardly on opposite sides of the recess 81 in a direction toward the opposite free edges 83 of the steel sheet. These cut lines 82, however, terminate short of the side edges 83 by a distance which is generally designated D/2. The overall dimensions of the recess 81 thus generally corresponds to the combined dimension of the recesses 55 and 56 in FIG. 7, thereby resulting in alternating notched and un-notched sheet portions 87 and 86 which thus correspond to the respective portions 43 and 42 in FIG. 7.

Figure 5:
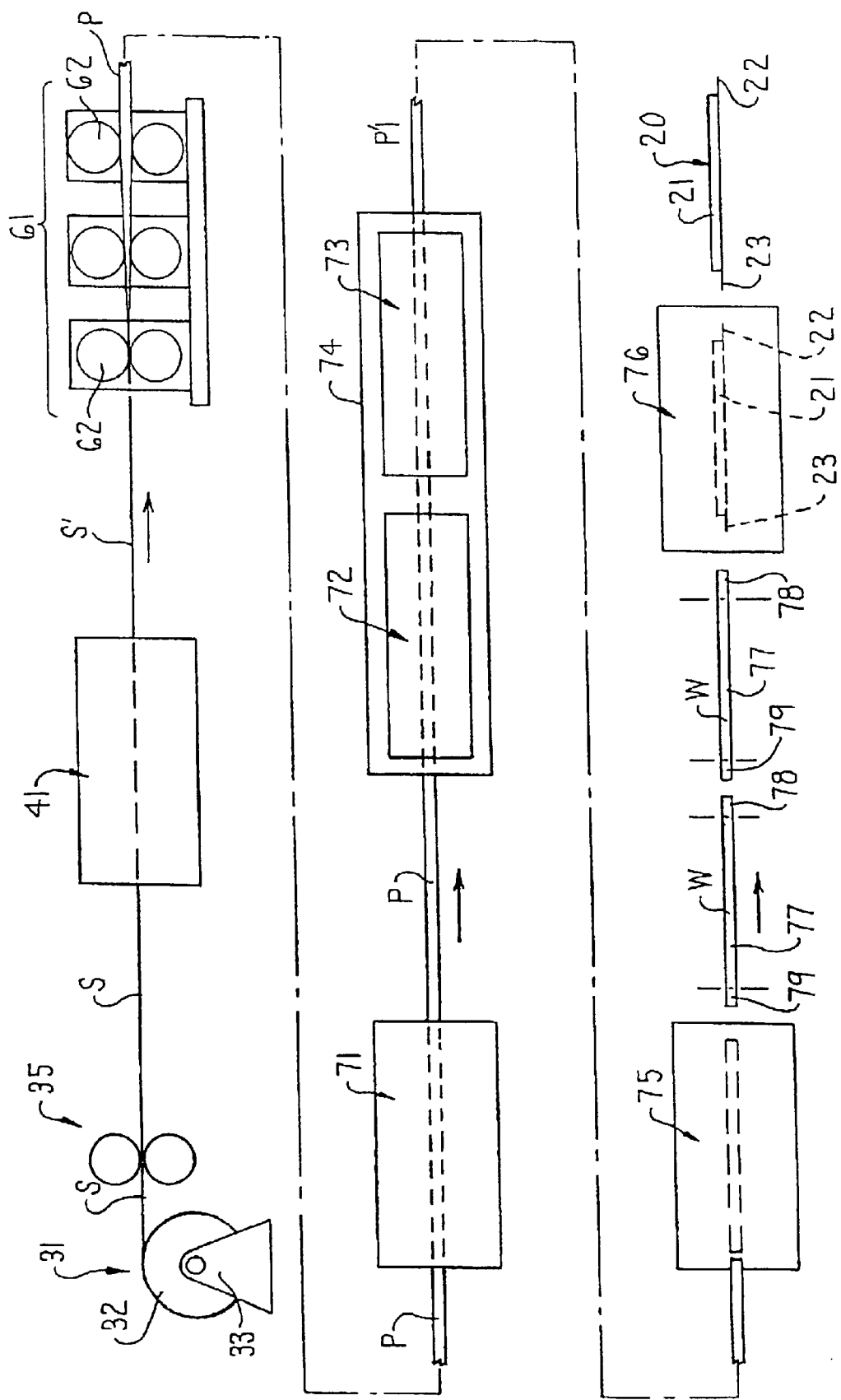
FIG. 5 is a diagrammatic representation of the forming process and apparatus according to the present invention for a structural beam, for example the door intrusion beam of FIGS. 3 and 4, with the diagrammatic representation being illustrated from one side of the initially supplied steel sheet.
Figure 6:
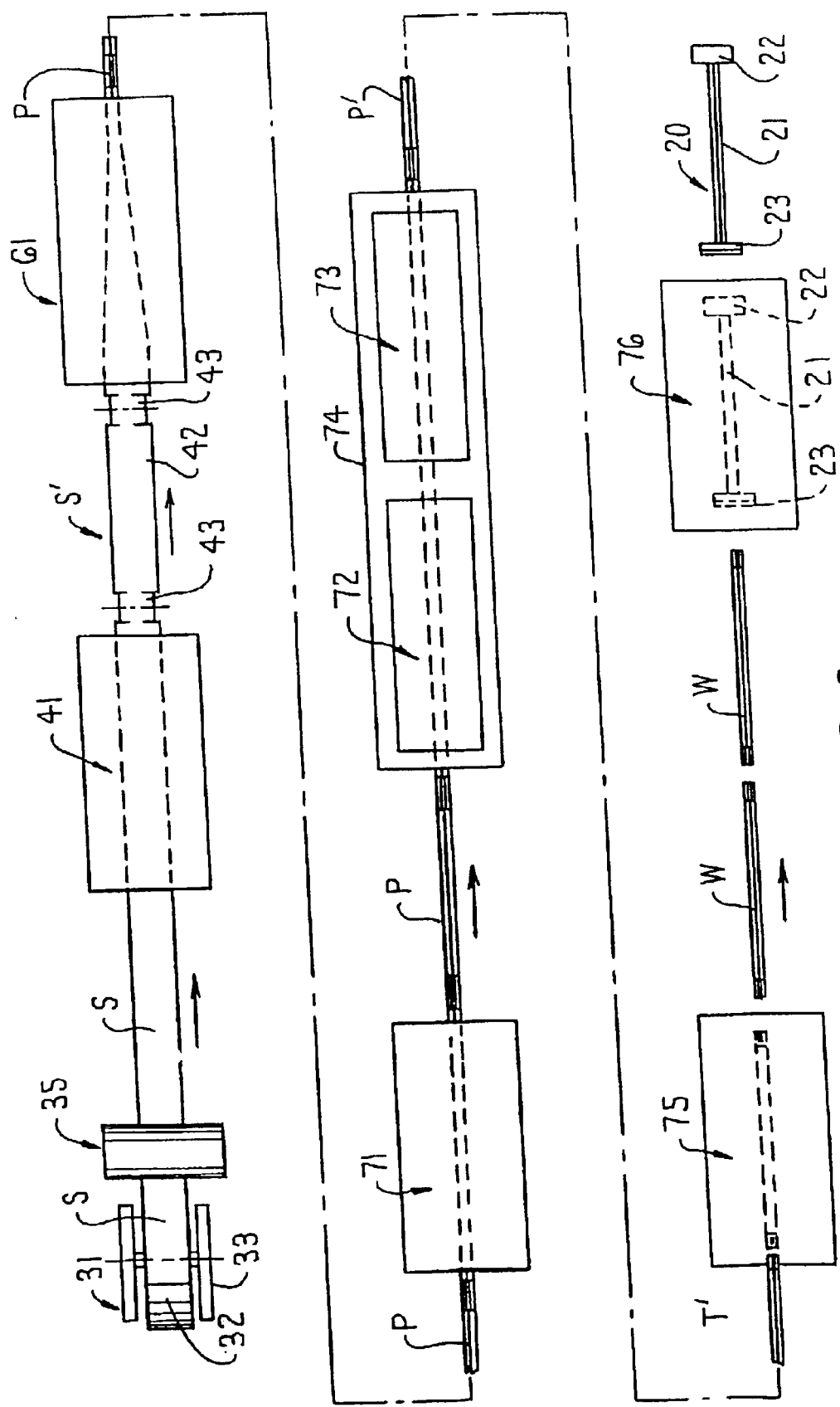
FIG. 6 is a diagrammatic representation of the process and apparatus of FIG. 5 but being taken from a view looking down onto the upper surface of the flat sheet.

With the sheet S' notched as illustrated in FIG. 11, the sheet is processed in the same manner as described in FIGS. 5 and 6 above, except that during the roll-forming of the sheet the opposed edges 83 meet throughout the entire length of the formed profile and thus are seam welded together by means of a continuous seam welding operation as the elongate profile is fed through the welding operation. This thus results in the closed tubular sections as defined by the un-notched regions 86 again having the same closed tubular profile as illustrated in FIG. 12, but in this variation the welded meeting edges 83 and the resulting seam weld 84 occur on the wider outer or bottom wall of the closed tube, rather than at the top wall as in the previous embodiment. Other than the weld seam being along the outer wider bottom wall, rather than in the top wall, the variation illustrated by FIGS. 11 and 12 is in all other respects the same as described above since the cutouts 81 will again appear in alternating fashion along the top wall of the formed profile so as to define alternating closed tubular and open profile sections which will undergo heat treating of solely the closed tubular sections in the same manner as discussed above. This thus permits forming of vehicle structural beams, such as door intrusion beams, having substantially the same structure and using substantially the same process as described above relative to FIGS. 1–10.

Referring to FIGS. 13 to 18, there is illustrated a second embodiment of a structural vehicle beam according to the present invention, which beam is manufactured according to the process of this invention. This embodiment, which comprises a roof or bumper beam for a vehicle, incorporates many of the same structural and functional features as the embodiment of FIGS. 1 to 12, and is manufactured by means of the same basis process. Corresponding parts of the embodiment of FIGS. 13 to 18 are thus designated by the same reference numerals used in FIGS. 1 to 10 but with a prime (') added thereto.

Figure 13:
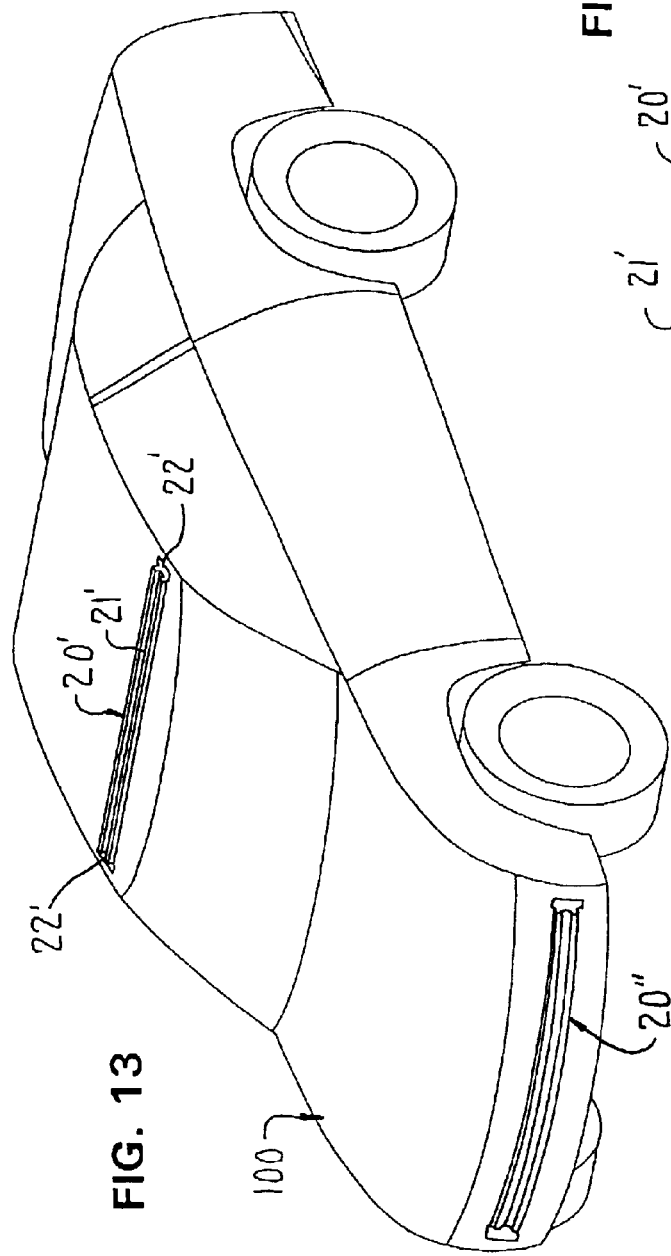
FIG. 13 is a diagrammatic view of a vehicle (i.e. an automobile) and illustrating a roof bow beam according to the present invention associated with the vehicle roof.
Figure 14:
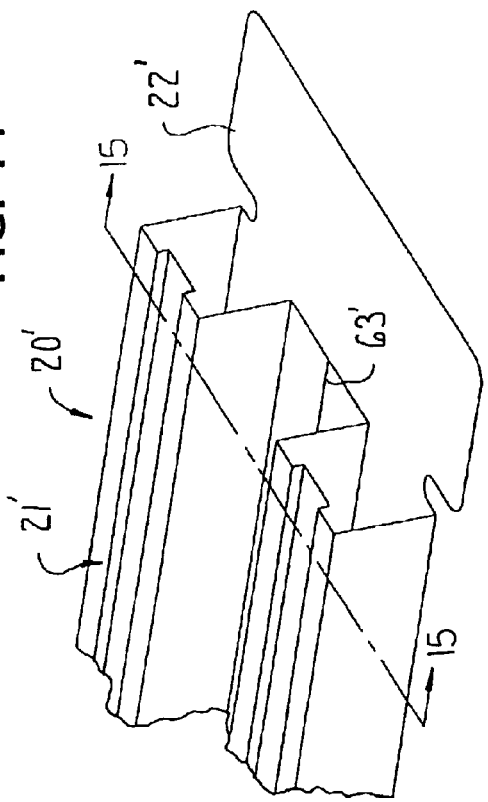
FIG. 14 is a fragmentary perspective view showing one end of the roof bow beam of FIG. 13.

FIG. 13 diagrammatically illustrates a vehicle, namely an automobile 100, having one or more structural roof beams 20' (often referred to as a roof bow or a roof header) associated therewith in a generally conventional manner. The roof beam 20' extends transversely across the roof and has end flanges which are fixed, as by welding, to the side frame elements (not shown) of the roof.

The roof beam 20' has an elongate tubular center section 21' which at opposite ends is integrally and monolithically joined to platelike end flanges 22' which in turn are used to effect securement to the vehicle frame (i.e., the side frame rails of the roof).

Figure 15:
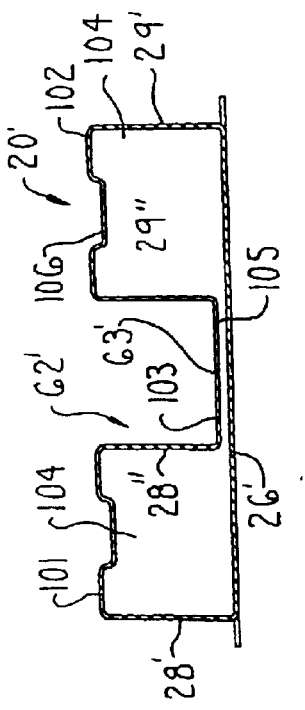
FIG. 15 is a cross-sectional view of the roof bow beam as taken along line 15—15 in FIG. 14.

The tubular center section 21' is defined by a bottom wall 26' which at opposite ends joins to upstanding sidewalls 28' and 29'. These sidewalls 28', 29' at upper ends thereof are joined by a top wall which includes two wall sections 101 and 102 which project inwardly from the respective sidewalls and are laterally spaced apart. The top wall sections 101 and 102 at inner ends thereof are joined respectively to downwardly projecting inner sidewalls 28" and 29". These latter sidewalls at lower ends thereof are joined to a third top wall section 103 which is spaced downwardly from and substantially spans the gap between the top wall sections 101 and 102. The wall section 103 is spaced upwardly above the bottom wall 26' by a small clearance distance. The top wall section 103 is defined by wall portions which are defined adjacent the sheet edges (i.e. edges 47' and 53' in FIG. 16) which, during roll forming, substantially abut to define a closed tubular cross section with these edges being welded together as indicated at 63' to define a closed tube. This closed tube, as shown in FIG. 15, has generally hollow boxlike tube sections 104 which extend lengthwise along opposite sides of tube part 21' in generally parallel relationship, and which are joined together by wall 103, thereby defining a channel-like recess 62' between tube sections 104.

The top wall sections 101 and 102, in the illustrated embodiment, have strengthening grooves 106 extending lengthwise therealong. The wall sections 101 and 102 are substantially coplanar and, in the illustrated embodiment, each wall section 101, 102, and 103 extends across about one-third the width of the beam.

The channel or U-shaped configuration of the tubular section 21' of the beam, and the resulting channel or U-shaped hollow interior, results in the beam having significant strength, particularly against bending, while having a small size and profile, and being of light weight.

The beam 20' in this FIGS. 13–18 embodiment has the end flanges 22' formed as substantially flat plates which are coplanar with and project outwardly from the bottom wall 26'. The end flanges 22' are shown as having a width which slightly exceeds the width of bottom wall 26', but this dimension as well as the shape of the end flanges can vary depending on the shape of the side frame rails of the vehicle roof and the nature of the connection therebetween.

The roof beam 20' as described above is formed by the same process as illustrated in FIGS. 5 and 6 and as described above. The forming of the roof beam 20' will, however, be briefly described with reference to FIGS. 5 and 16 for purposes of completeness.

The steel sheet as supplied from the supply station 31 (FIG. 5) is appropriately notched and/or cut at defined intervals therealong so that the continuous sheet has alternating un-notched and notched regions 42' and 43' respectively, which ultimately respectively define the center tubular part and the end flanges of the structural beam. The notches 55', 56' in this embodiment, as in FIG. 7 as described above, open inwardly from the side edges 47', 53' of the sheet. The side edges 45', 46' and 51', 52' of these notches project inwardly a small distance beyond the notch bottom wall 54', 57', and in this embodiment the slits defining the notch sides are defined as narrow slots or cutouts to thus define both a rounded corner and a small space or distance 107 between the end of the center beam part and the main body of the end flanges, which space is bridged by an extension of the respective end flange.

In the beam of FIGS. 13 to 18, the end flange 22' has a width which slightly exceeds the width of the bottom wall 26' of the tubular part, whereby during rolling of the profile P', the notched sections 43' will be formed into a shallow channel-shaped cross section as illustrated in FIG. 18. After the profile P' has been heated and quenched, which resulted in a substantial increase in the strength and hardness of only the closed tubular sections 62', then the notched sections 64' can be physically reformed or reshaped, as desired, to define the desired shape and/or size of the end flanges. This reshaping of the end flanges will typically occur after the profile is transversely cut along lines 44' to effect forming of the individual beam members of length L', but such reshaping of the end flanges could take place prior to such cutting if appropriate.

As illustrated in FIG. 13, the present invention also permits forming of a bumper beam 20" which, as illustrated, is similar in cross section to roof beam 20', although it will be appreciated that the structural beam of this invention may assume other configurations particularly in cross section.

While the invention as described above relates to vehicle beams such as door intrusion, roof and bumper beams, it will be appreciated that these are merely exemplary of the present invention, and that the invention is also applicable for forming a wide range of beam sizes, shapes and configurations, particularly structural beams intended for incorporation into a vehicular structure. For example, beams constructed in accordance with this invention can be used at least in part in the construction of the space frame or structural cage as proposed for vehicle constructions so as to optimize strength while minimizing weight, and can also be used as structural reinforcements for floors and rocker panels of vehicles.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An elongate structural beam for a vehicle, comprising;
   (1) a one piece, monolithic, elongate structural member constructed of sheet steel;
   (2) said one piece, monolithic, elongate structural member including:
      (a) an elongate center beam part roll formed of said sheet steel and having a closed tubular cross section, and
      (b) first and second flange parts located, respectively, at opposite ends of said elongate center beam part,
   (3) the elongate center beam part being of high-strength steel formed by heat treating solely the elongate center beam part, and the flange parts being of low-strength steel permitting welded attachment to a frame.

2. The beam of claim 1, wherein the elongate center beam part has adjacent edges extending along the length thereof and welded together to define the closed tubular cross section.

3. The beam of claim 2, wherein each said flange part includes a flat plate-like portion which projects away from the respective end of the elongate center beam part in the lengthwise direction thereof.

4. The beam of claim 3, wherein each said flange part includes a second flat plate-like portion which is monolithically joined to and projects transversely relative to said first mentioned flat plate-like portion.

5. The beam according to claim 2, wherein the elongate center beam part is defined by a plurality of generally flat sides joined to define a generally trapezoidal cross-sectional shape, and wherein said flanges are monolithically and integrally joined directly to only one of said flat sides at opposite ends thereof.

6. The beam according to claim 2, wherein the elongate center beam part includes a pair of generally hollow box-like tube sections which extend lengthwise of the center beam part in generally parallel but sidewardly spaced relationship and which are joined by a generally flat base wall which extends between the hollow box-like tube sections and which also defines one of the side walls of said hollow box-like tube sections, and said flanges being monolithically and integrally joined directly to only said base wall at opposite ends thereof so that said flanges project outwardly away from said base wall beyond the respective ends of the elongate center beam part.

7. A vehicle impact beam according to claim 5, wherein the closed tubular cross section of said center beam part is generally trapezoidal and is defined by generally front and rear flat side walls joined together by a pair of generally flat edge walls which converge as they join to the rear side wall, and said flanges being integrally and monolithically joined to and projecting outwardly from solely said front side wall.

8. The beam of claim 1, wherein the beam is formed from a unitary, monolithic piece of low-strength steel sheet which is notched at predetermined intervals forming notched and un-notched portions; the un-notched portion of the sheet being formed into a closed tubular portion by fixedly connecting side edges of the un-notched portion; and only the un-notched portion being treated to strengthen only the tubular portion which defines the elongate center part of the beam.

9. The beam according to claim 2, wherein the beam is one of a door intrusion beam, a bumper beam and a roof beam, and wherein the flanges are welded to a vehicle frame.

10. A door intrusion beam for disposition within and attachment to a door frame of a vehicle, comprising an elongate, one-piece, monolithic structural beam member constructed of sheet steel and having an elongate roll-formed center beam part defining a closed tubular cross section, the structural beam member also having first and second flange parts respectively located at opposite ends of said elongate center beam part and integrally and monolithically joined thereto, said elongate center beam part being of heat-treated high strength steel, and said flange parts being of low strength steel to permit welded securement of the flanges to the door frame.

* * * * *